United States Patent [19]

Homma et al.

[11] Patent Number: 4,783,648

[45] Date of Patent: Nov. 8, 1988

[54] DISPLAY CONTROL SYSTEM FOR MULTIWINDOW

[75] Inventors: Nobuyuki Homma, Yokohama; Masayuki Satta, Kawasaki, both of Japan

[73] Assignee: Hitachi, Ltd., Tokyo, Japan

[21] Appl. No.: 879,621

[22] Filed: Jun. 27, 1986

[30] Foreign Application Priority Data

Jul. 1, 1985 [JP] Japan .................. 60-142461

[51] Int. Cl.$^4$ ............................. G06F 3/00
[52] U.S. Cl. .................. 340/724; 340/721
[58] Field of Search .......... 340/721, 724, 723, 747, 340/734

[56] References Cited

U.S. PATENT DOCUMENTS 4,555,775 11/1985 Pike .................................. 340/721

FOREIGN PATENT DOCUMENTS

0102284 6/1984 Japan .

Primary Examiner—John W. Caldwell, Sr.
Assistant Examiner—Alvin Oberley
Attorney, Agent, or Firm—Antonelli, Terry & Wands

[57] ABSTRACT

In a multiwindow system in which a plurality of windows are set on a display screen at positions such that these windows partially overlap and the display priority and position of each window can be arbitrarily changed, when the operator instructs to change the display priority of the window, a check is automatically made to see if there exists the window which will be completely covered by the other windows having priorities higher than that of this window and will fully disappear from the screen if the display priority is changed or not. If such a window is found out, the display priority of this window is changed in the state in which this window is automatically shifted to the position where a part of this window can be seen on the screen, thereafter the window is displayed on the screen. The changing process of the display priority of the window and the automatic shifting process of the position of the window are controlled by referring to and correcting the contents of the window management tables in which the data indicative of the sizes, positions, display priorities, and the like of the respective windows is stored.

9 Claims, 7 Drawing Sheets

FIG. 3  LOGIC SCREENS INTO A DISPLAY 11

FIG. 6 SHIFT OF WINDOW POSITION

FIG. 8   WINDOW MANAGEMENT TABLE

|       | 31 | 32 | 33 | 34 | 35 | 36 | 37 |    |
|-------|----|----|----|----|----|----|----|----|
| 30A   | 20 | $X_0$ | $Y_0$ | $L_0$ | $H_0$ | $P_0$ | -- | --- |
| 30B   | 21 | $X_1$ | $Y_1$ | $L_1$ | $H_1$ | $P_1$ | -- | --- |
| 30C   | 22 | $X_2$ | $Y_2$ | $L_2$ | $H_2$ | $P_2$ | -- | --- |

|       | 361 | 362 | 363 | 364 | 365 | 366 | 362' | 363' |
|-------|-----|-----|-----|-----|-----|-----|------|------|
| 360A  | 4 | $X_0$ | $Y_0$ | $L_{20A}$ | $H_{20A}$ | 20 | $X_0$ | $Y'_0$ | -- |
| 360B  | 1 | $X_1$ | $Y_1$ | $l$ | $h$ | 20 | | |
| 360C  | 0 | | | | | | | |

| 50 | 20 | 21 | 22 |
|----|----|----|----|

FIG. 9   WINDOW MANAGEMENT TABLE

|       | 31 | 32 | 33 | 34 | 35 | 36 | 37 |    |
|-------|----|----|----|----|----|----|----|----|
| 30A   | 20 | $X_0$ | $Y_0$ | $L_0$ | $H_0$ | $P_0$ | -- | --- |
| 30B   | 21 | $X_1$ | $Y'_1$ | $L_1$ | $H_1$ | $P_1$ | -- | --- |
| 30C   | 22 | $X_2$ | $Y_2$ | $L_2$ | $H_2$ | $P_2$ | -- | --- |

|       | 361 | 362 | 363 | 364 | 365 | 366 | 362' | 363' |
|-------|-----|-----|-----|-----|-----|-----|------|------|
| 360A  | 0 | | | | | | | |
| 360B  | 1 | $X_1$ | $Y'_1$ | $l$ | $\delta$ | 21 | | |
| 360C  | 2 | $X_2$ | $Y_2$ | $L_2$ | $H_{22A}$ | 22 | $X'_2$ | $Y_0$ |

| 50 | 21 | 22 | 20 |
|----|----|----|----|

FIG. 10

FIG. 11 TABLE UPDATE PROCESS 64

DISPLAY CONTROL SYSTEM FOR MULTIWINDOW

BACKGROUND OF THE INVENTION

The present invention relates to a screen display system in an information processing terminal and, more particularly, to a control system for multiwindow display in which a plurality of windows are set in one display screen and data can be independently displayed for every window.

In the information processing terminal equipped with a display device, a rectangular region called a window is set on the display screen, data such as, e.g., characters and the like read out of a data file is displayed in this window, key input operations are executed with reference to the displayed data, and another document is made in another region on the display screen. In what is called a multiwindow system in which a plurality of such windows are set on one display screen, the respective windows are displayed so as to overlap one another while maintaining an arbitrary positional relation. In the case of overlappingly displaying a plurality of windows as mentioned above, hitherto, each side of the overlap windows is used as a parting line and each window is divided into a plurality of rectangular sub-regions and managed, thereby allowing the windows to be displayed in a manner such that a part of the lower window is hidden under the upper window which will be overlapped thereon as disclosed in the JP-A No. 59-102284. If the operator wants to see the data in the hidden region, for example, it is sufficient for the operator to designate the lower window by a cursor and shift the display position thereof, or to change the order with respect to the overlap relation such that the window having the hidden region has the highest display priority.

However, in the conventional multiwindow display device, in the case where the above-mentioned display priority is changed in the state in which another window smaller than one large window was overlappingly displayed in this large window, the small window which has been displayed so far is hidden under the large window, so that the small window completely disappears from the screen. The window which has disappeared from the screen as mentioned above cannot be designated by the cursor. Therefore, such a window cannot be redisplayed on the screen by the ordinary overlap relation changing operation mentioned above. The window which has disappeared can be redisplayed by a special command inputting operation from the keyboard. However, in this case, there is an inconvenience such that the operator must memorize the command format and the overlap order of each window. Consequently, prior to changing the display priority, the operator needs to pay attention to the positional relation among the respective windows and to preliminarily shift the windows which may disappear to safe positions.

SUMMARY OF THE INVENTION

It is an object of the present invention to provide a multiwindow display control system in which the operator can easily change the display priorities of the windows without paying any attention to the positional relation among the windows.

Another object of the invention is to provide a multiwindow display control system which can prevent the possibility that the windows will disappear from the display screen due to a change of the display priorities of the windows.

To accomplish the above object, according to a multiwindow display control system of the invention, when a command to designate the first window as one of the windows which are being displayed and thereby to change the display priority of the first window is given, a check is made to see if there exists a second window at such a location that it will completely disappear from the screen by being completely overlapped by another window if the display priority of the first window is changed. If such a second window is found, the location of the second window is automatically corrected so that at least a part of the second window can remain on the screen after the display priority is changed. In this state, the display priority is changed to thereby update the display screen. The detection of the second window and the automatic correction of the position are executed by reference to the window management data indicative of the position, size, and display priority of each window.

The foregoing and other objects, advantages, manner of operation, and novel features of the present invention will be understood from the following detailed description when read in connection with the accompanying drawings.

DESCRIPTION OF THE PREFERRED EMBODIMENTS

Figures 1, 2:
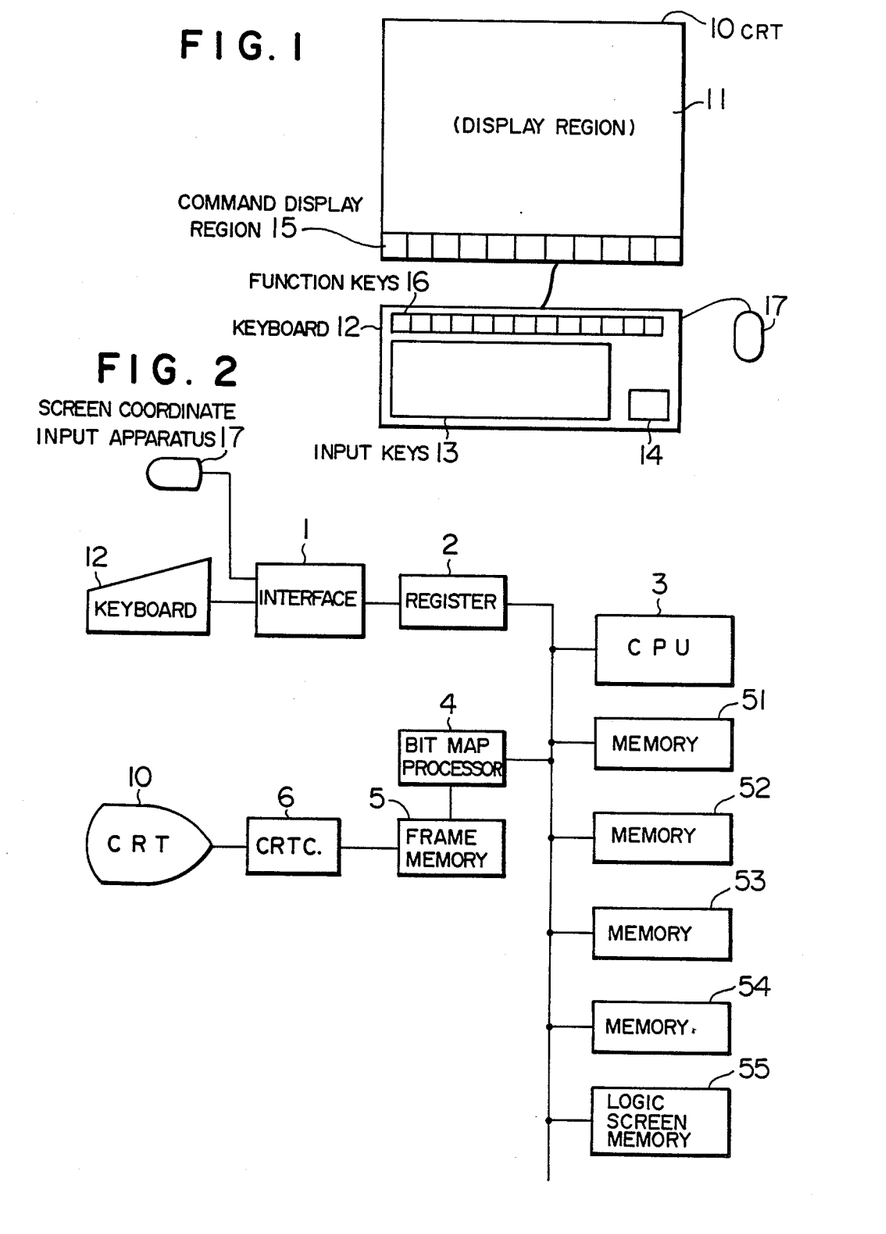
FIG. 1 is an external view of the main part of a terminal apparatus to which the present invention is applied.
FIG. 2 is a block diagram showing a whole arrangement of the terminal apparatus.

FIG. 1 is an external view of an information processing terminal apparatus to which the present invention is applied, in which reference numeral 10 denotes a display device (CRT) having a display screen consisting of a display region 11 and a command display region (display menu) 15 to operate windows; 12 is a keyboard having input keys 13 to input code data such as characters, numerals, symbols, etc., cursor control keys 14 to move a cursor vertically and horizontally, and function keys 16 to control windows; and 17 is a screen coordinate input apparatus.

FIG. 2 is a block diagram showing a whole arrangement of a control system of the information processing terminal apparatus mentioned above. The data and commands input from the keyboard 12 and the screen coordinate values of the display menu instructed by the input apparatus 17 are input to a register 2 through an interface circuit 1 and read by a CPU 3. The CPU 3 executes control programs stored in a memory 51 in accordance with the input commands. Numerals 52, 53, and 54 denote memories to store table data for management of windows which will be explained hereinafter. Data of a plurality of logic screens is stored into a memory 55. The partial regions of these logic screens are displayed in each window on the CRT 10. When data is input from the keyboard 12, the data is produced or corrected for the logic screen designated in the memory 55 and the display data is sequentially transferred to a bit map processor (BMP) 4 in accordance with the content of the window management table. The BMP 4 expands the display data as a bit map in a frame memory 5. A CRT controller 6 sequentially reads out the content of the frame memory 5 and outputs this data to the CRT 10.

Figure 3:
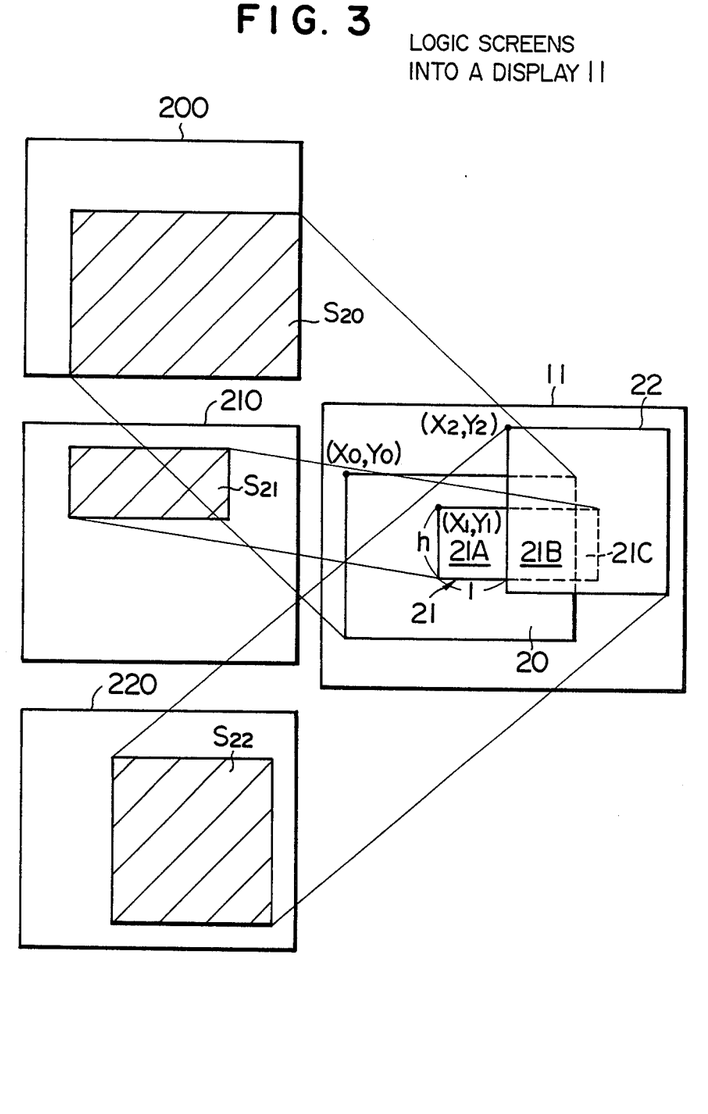
FIG. 3 is a diagram for explaining the correspondence relation between the multiwindow on a display screen and the logic screen.
Figure 4:
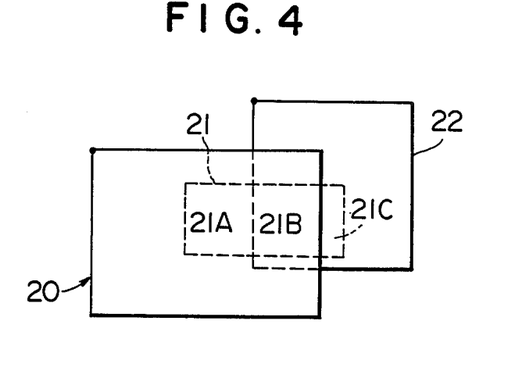
FIG. 4 is a diagram showing a state of the display screen according to a conventional control system in the case where the display priority is changed.

FIG. 3 shows the relation between the logic screen and the windows. In this example, a partial region $S_{20}$ of a logic screen 200, a partial region $S_{21}$ of a logic screen 210, and a partial region $S_{22}$ of a logic screen 220 stored in the memory 55 are displayed in a first window 20, a second window 21, and a third window 22 set in the display screen 11 of the CRT 10, respectively. The display priority of the first window 20 is the lowest and the second and third windows 21 and 22 overlap the first window 20, so that a part of the window 20 is hidden. The second window 21 is displayed in the region where it is completely included in the display region consisting of the first and third windows 20 and 22 and only a partial region 21A is displayed. Therefore, in this state, if the operator changes the display priority so that the whole region of the first window 20 can be seen, according to the conventional apparatus, the second window 21 will be completely hidden under the first and third windows as shown in FIG. 4. According to the present invention, however, when the display priority is changed, the positional relation of each window is automatically checked and if there exists any window which will be completely covered and hidden by other windows as shown in FIG. 4, this window is automatically shifted to another position, thereby enabling some portions of all of the windows to certainly appear on the screen as shown in, e.g., FIG. 5. With this method, any desired window can be designated by a cursor C as well. Therefore, the operator can sequentially change the display priorities of the windows without worrying about the positional relation among the windows.

Figure 6:
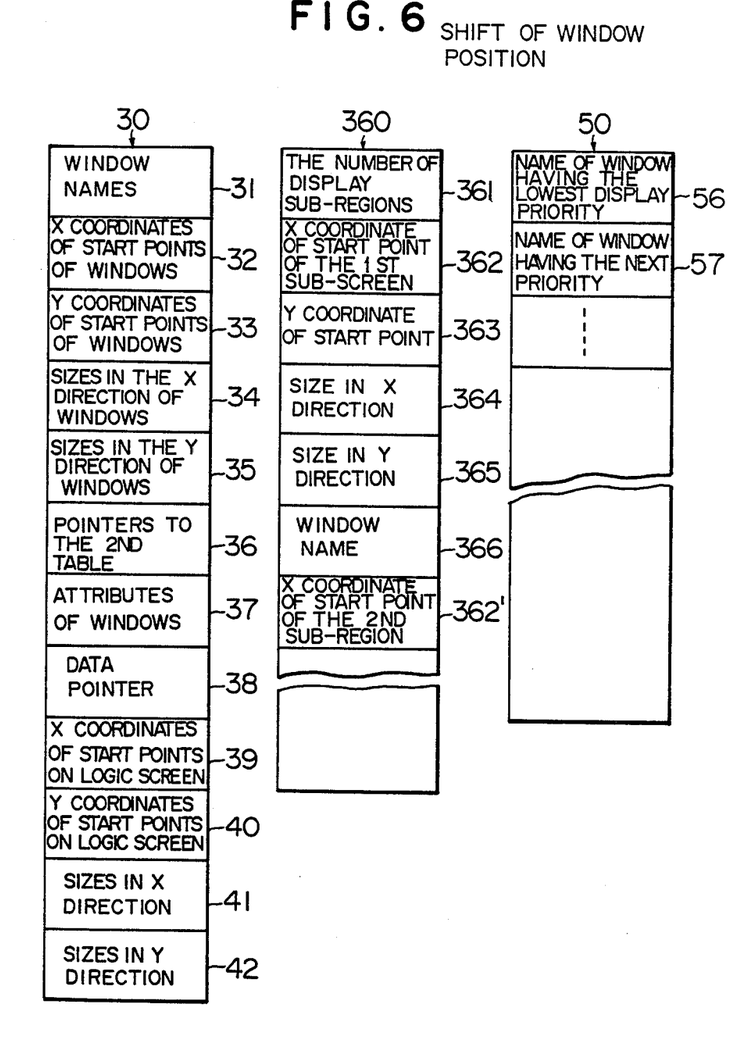
FIG. 6 is an explanatory diagram of the first to third window management tables which are used to perform the display control of the invention.

The above-mentioned automatic shifting operation of the window position can be executed by use of window management tables 30, 360, and 50 shown in FIG. 6.

The first table 30 defines the relation amount the display position and size of the window and the logic screen corresponding thereto for every window defined in the display screen 11 and is formed in the memory 52. For example, as shown in FIG. 6, the first table 30 comprises: a window name 31; X coordinates 32 and Y coordinates 33 of the start points of the windows on the display screen 11, (these coordinates correspond to ($X_0$, $Y_0$), ($X_1$, $Y_1$), and ($X_2$, $Y_2$) in FIG. 3); size 34 in the X direction of the window; size 35 in the Y direction; a pointer 36 to the second table 360, which will be explained hereinafter; window attribute information 37 to designate the presence or absence of the window stripe, color of the window frame, and the like; data pointer 38; X coordinates 39 and Y coordinates 40 of the positions of the start points of the corresponding partial regions ($S_{20}$, $S_{21}$, $S_{22}$ in FIG. 3) on the logic screen; and sizes 41 in the X direction and sizes 42 in the Y direction of the foregoing partial regions.

In the case where one window is overlappingly displayed on other windows on the display screen 11, the second table 360 defines the positions and sizes of the sub-regions which are currently displayed and also defines the incorporating relations among the sub-regions and the other windows. The second table 360 is formed in the memory 53. When considering the first window 20 shown in FIG. 3 as an example, since the first window 20 is overlapped by the second and third windows 21 and 22, in order to partially display the data in the logic screen region $S_{20}$, the region $S_{20}$ is divided into a plurality of sub-regions 20A to 20F using each side of the second and third windows as a parting line as shown in, e.g., FIG. 7, and only the sub-regions 20A to 20D among them are set to the regions where data should be displayed. For every window, the second table 360 stores the number 361 of sub-regions into which data should be displayed as mentioned above, X coordinates 362 of the start points of the respective sub-regions, Y coordinates 363 of the start points thereof, sizes 364 in the X direction, sizes 365 in the Y direction, and window name 366 indicative of the window having the highest display priority among the windows incorporating these sub-regions. In the case where any other window does not exist under the sub-regions but is directly displayed on the display screen, the name of the window as a base window of the sub-regions is recorded as the window name 366.

The third table 50 stores the window names which are sequentially displayed in accordance with the display priorities. For example, as shown in FIG. 6, the third table 50 sequentially stores the window names 56, 57, . . . in accordance with the order from the lowest display priority. The third table 50 is formed in the memory 54.

Figure 8:
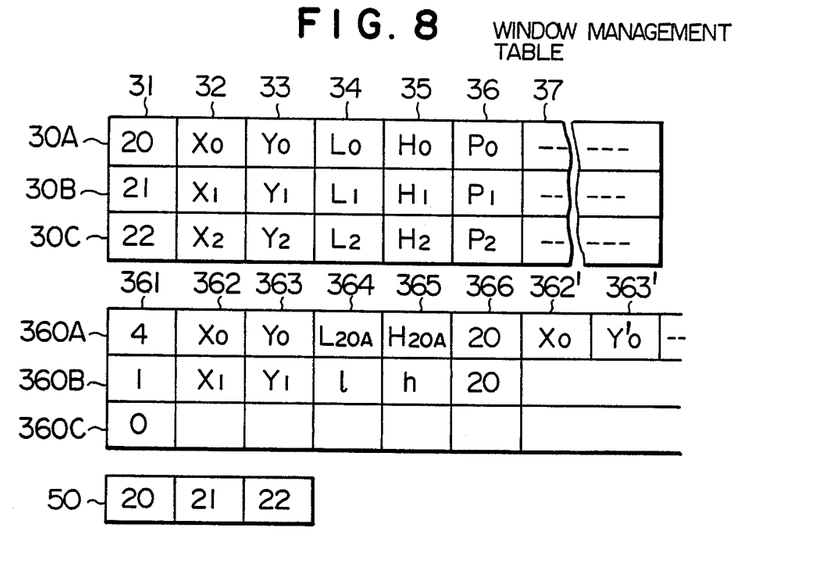
FIG. 8 is a diagram for explaining the content of the window management table corresponding to the display state of FIG. 3.

FIG. 8 shows the contents of the first to third tables in the case where the windows 20 to 22 are displayed as shown in FIG. 3. In FIG. 8, reference numerals 30A, 30B, and 30C respectively correspond to the windows 20, 21, and 22, and pointers $P_0$, $P_1$, and $P_2$ respectively represent the head addresses of second tables 360A, 360B, and 360C corresponding to those windows 20 to 22. The second table 360A to manage the display region of the first window 20 stores the data regarding four sub-regions 20A, 20B, 20C, and 20D. In FIG. 8, the data regarding the sub-region 20A is shown as examples in the columns 362 to 366 in the table 360A and the description of the data with respect to the sub-regions 20B, 20C, and 20D subsequent to those data is omitted for convenience of explanation. The second window 21 is divided into three sub-regions 21A, 21B, and 21C shown in FIG. 3, and data will be displayed in only the sub-region 21A among these sub-regions. Therefore, the second table 360B corresponding to this window stores the data regarding the subregion 21A. Since the whole region of the third window 22 is used to display data, there is no need to divide the third window into sub-regions and the second table will become as shown at 360C.

Figure 5:
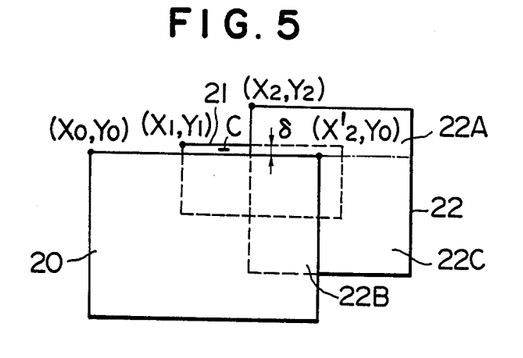
FIG. 5 is a diagram showing a state of the display screen according to a control system of the present invention in the case where the display priority is changed.
Figure 7:
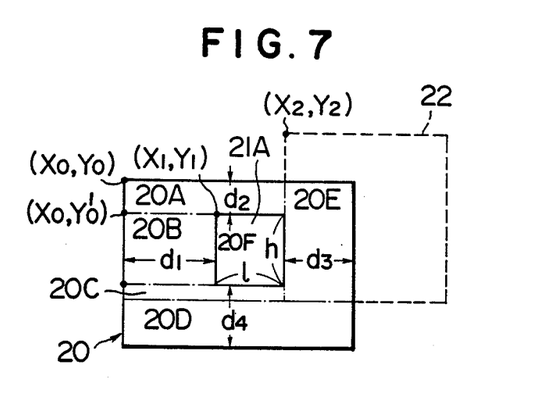
FIG. 7 is an explanatory diagram with respect to sub-regions in a window which is partially displayed.
Figure 9:
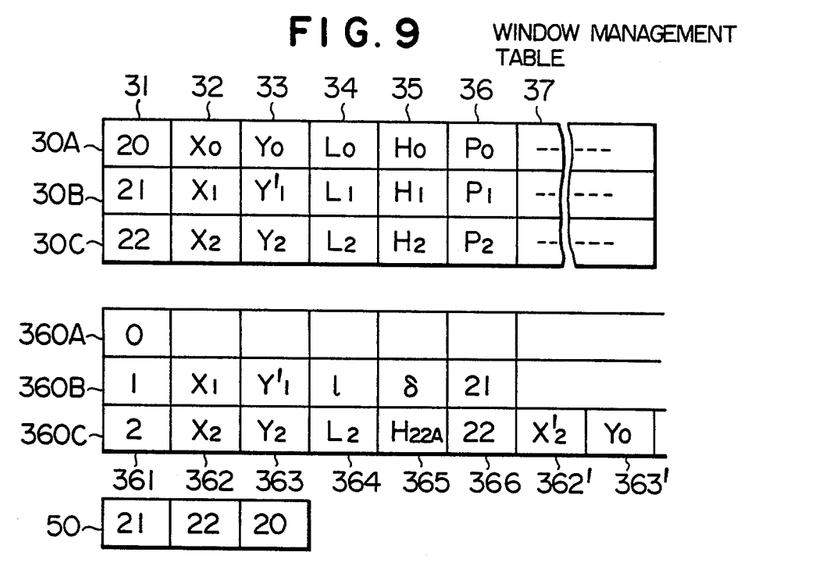
FIG. 9 is a diagram for explaining the content of the window management table corresponding to the display state of FIG. 5.

When the display priority is changed so that the first window 20 has the highest priority, each of the foregoing tables is rewritten as shown in FIG. 9 to obtain the display state of FIG. 5 in which the second window 21 was shifted. Although the moving direction of the second window 21 may be arbitrarily set, it is preferable to shift the second window in the direction such that an amount of movement becomes minimum in order to allow the positional relations among the windows on the display screen to become similar to the original state (FIG. 3). As a result of the fact that distances $d_1$ to $d_4$ between the display portion 21A of the second window and each side of the first window 20 were obtained, it has been found that the value of $d_2$ shown in FIG. 7 is the minimum; therefore, it will be understood that it is desirable to shift the second window 21 toward the upper side of the first window 20. It is assumed that the amount of movement is set to the value of which a predetermined exposed width $\delta$ shown in FIG. 5 was added to the distance $d_2$. The value of $\delta$ may be set to a value such that the exposed portion of the second window can be selected by the cursor, for example, a value about equal to the number of dots of one character.

In FIG. 9, the value of the Y coordinate indicative of the start point of the second window 21 is updated to $Y'_1 = Y_1 + d_2 + \delta$ in the first table 30A to 30C. In the second table, the content of the table 360A regarding the first window having the first display priority is updated such that the number of divided regions becomes zero. The content of the table 360B regarding the second window of which the display region was shifted is corrected to the data indicative of the redivided sub-region having the exposed width $\delta$. Since the third window 22 is partially covered by the first window 20, the third window is divided into a plurality of sub-regions 22A, 22B, and 22C and the data regarding two sub-regions 22A and 22C to be displayed is registered into the table 360C.

The operating procedure of the operator in the terminal apparatus to which the invention is applied and the control procedure of the programs which are executed by the CPU will now be described with reference to FIGS. 10 and 11.

When a plurality of windows are displayed on the display screen as shown in FIG. 3, if the operator wants to change the display priority of a window, the operator operates the screen coordinate input aparatus 17 and moves the cursor on the screen to designate a desired window. Thereafter, the operator selects the display priority change command for allowing the designated window to be most preferentially displayed from among the window operating commands displayed in the ccmmand display area 15 on the screen. The content similar to this command can be also instructed in the following manner. Namely, the cursor is moved using the cursor control key 14 on the keyboard 12, the function key 16 is operated, a desired window is selected, and the display priority is changed.

Figure 10:
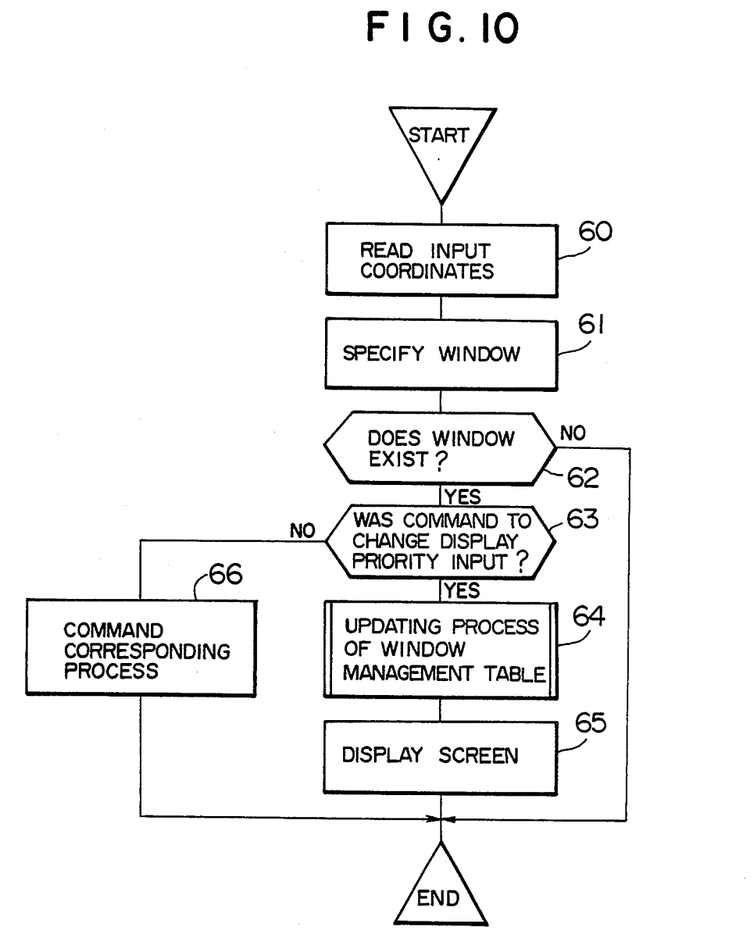
FIG. 10 is a diagram showing an example of a program flowchart for realizing the display control of the present invention.

After the foregoing window designating operation was executed, the CPU 3 first reads the screen coordinates (input coordinates) corresponding to the position of the cursor (step 60) as shown in FIG. 10. Then, the CPU 3 specifies the window with reference to the window management tables 30, 360, and 50 stored in the memories 52 to 54 (step 61). In the case where a plurality of windows incorporating the above-mentioned input coordinates exist in the first table 30, the window including the input coordinates in the display sub-region is specified as a window to be operated by reference to the second or third table.

On the contrary, if the relevant window does not exist, it is determined that the operation is erroneous and this processing routine is finished (step 62). If the relevant window is found, the window name is stored and then the command discriminating step 63 is executed. If the input command designates the change of the display priority, the table updating routine 64, which will be explained hereinbelow, follows and the window management table schematically shown in FIG. 9 is updated. Thereafter, the screen is displayed (step 65) and the processes responsive to the command input at the present time are finished. If the input command does not instruct the change of the display priority, the processing routine advances to step 66 and other processes corresponding to the input command are executed.

In the updating routine 64 of the window management table, the updating processes of the second and third tables in association with the change of the overlap relations among the respective windows and the updating processes of the first and second tables in association with the operation to automatically shift the window posiions with respect to the windows having lower display priorities which are completely incorporated in the window having the higher display priority are mainly executed.

For two windows which are influenced by the change of the display priorities, assuming that the X coordinates and Y coordinates of the start points of the respective windows and the sizes in the X and Y directions thereof are $(X_0, Y_0, L_0, H_0)$ and $(X_1, Y_1, L_1, H_1)$, if all of the following inequalities $$\left. \begin{array}{l} X_0 < X_1 + L_1 \\ Y_0 < Y_1 + H_1 \\ X_1 < X_0 + L_0 \\ Y_1 < Y_0 + H_0 \end{array} \right\} \quad (1)$$

are satisfied, it will be determined that an overlap portion exists between those two windows. In this case, as already described in conjunction with FIG. 7, the window having a lower display priority is divided into a plurality of rectangular sub-regions using one or more sides of one or more windows having higher display priorities which overlap the low-priority window as a reference or references. The data with respect to the sub-regions to be displayed is registered or corrected in the second table corresponding to the divided window.

If all of the following inequalities $$\left. \begin{array}{l} X_0 \leqq X_1 \\ X_0 + L_0 \geqq X_1 + L_1 \\ Y_0 \leqq Y_1 \\ Y_0 + H_0 \geqq Y_1 + H_1 \end{array} \right\} \quad (2)$$

are satisfied between two windows, it is determined that the first window represented by ($X_0$, $Y_0$, $L_0$, $H_0$) completely incorporates the second window indicated by ($X_1$, $Y_1$, $L_1$, $Y_1$). When the display priority of the first window becomes higher than that of the second window, if the foregoing incorporating relation is satisfied, the display position of the second window is automatically shifted, so that the contents of the first and second tables are partially corrected.

Figure 11:
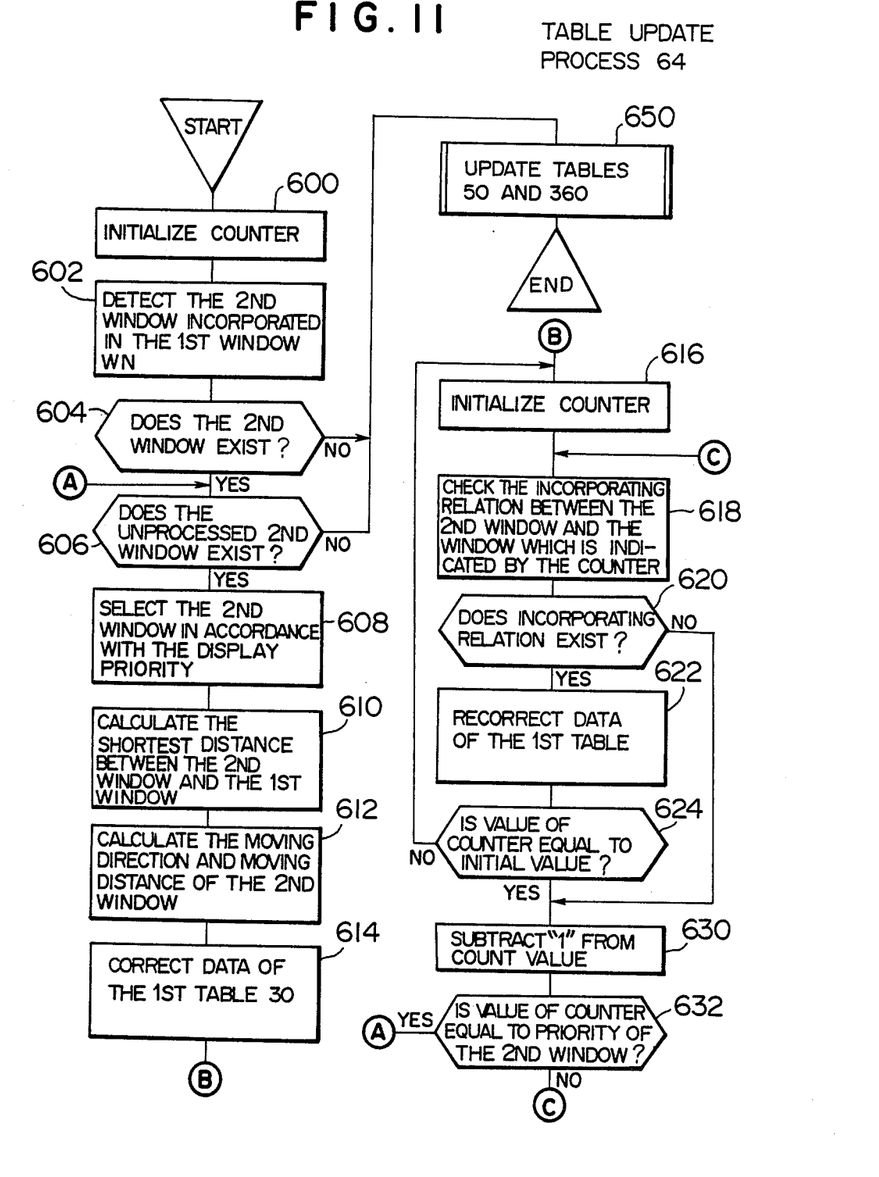
FIG. 11 is a flowchart showing an embodiment of a routine 64 in FIG. 10.

The flowchart of FIG. 11 shows the details of the portion to realize the function to automatically shift the second window in association with the advance of the display priority of the first window WN among the processes in the window management table updating routine 64. In this flowchart, in the case where the first window WN having the display priority of n was advanced by only K so that the first window WN is to be more preferentially displayed, the display position of the window incorporated in the first window after its display priority was changed is automatically shifted in the following manner.

First, in step 600, the initial value "n" is set into the display priority counter. Next, in step 602, by reference to the third table 50, the names of windows having higher display priorities than the original display priority n of the first window WN and registered in the (n+1)th to (n+K)th columns are obtained. With regard to those K windows, a check is made to see if the portion which is currently being displayed (the whole window or all of the sub-regions registered in the second table) satisfies the relation of expression (2) for the first window WN or not with reference to the first and second tables 30 and 360. In this way, it is possible to find the second window which will have been incorporated in the first window WN after its display priority was changed. If NO results in step 604, namely, if the second window which satisfies such a condition cannot be found, routine 650 follows. In routine 650, the third table 50 is updated to change the display priority to the new priority and the overlap relation between the windows is checked due to expression (1) and the second table 360 is rewritten on the basis of the new overlap relation.

If at least one second window which is incorporated in the first window WN after its priority was changed exists, step 606 follows and all of the second windows are sequentially designated as the windows to be discriminated from the window having a higher display priority (step 608). The distances $d_1$ to $d_4$ between the current display portion and each side of the first window WN are calculated (step 610). The direction in which the shortest distance can be derived is set to the moving direction and the value of the shortest distance $+\delta$ is set to the amount of movement (step 612). The values (the values in the column 32 or 33) of the coordinate data in the first table 30 regarding the second window are corrected (step 614). In the case where the second window to be discriminated has been divided and displayed as a pluralit of sub-regions, the positional relation between each sub-region and the first window WN is checked and the moving direction of the shortest distance is obtained.

In the processes in steps 616 to 632, in the case where the second window is automatically shifted is incorporated in another window which has a higher display priority than that of the second window and which is different from the first window WN, the automatic shifting operations are again executed to avoid this incorporating relation. In step 616, the initial value "n+K−1" is set to the display priority counter. Thereafter, in step 618, a check is made to see if the incorporating relation exists between the second window to be discriminated and the window indicated by the display priority counter or not. If NO results in step 620, only "1" is subtracted from the value of the display priority counter in step 630. A check is made to see if the value of the counter coincides with the display priority of the second window or not (step 632). If YES, it is determined that all of the discriminating processes have been finished and step 606 follows. If NO, the processing routine is returned to step 618 and the incorporating relation between the next window indicated by the display priority counter and the second window is checked. If it is determined that the incorporating relation exists in step 618, the value of which a predetermined value $\delta$ was added to a distance $d_i$ with the new window detected at present in the moving direction obtained in step 612 is set to a new amount of movement and the values of the coordinate data of the second window in the first table are again corrected. There is a possibility that the result of the decision of "No incorporating relation exists" previously obtained becomes invalid in step 618 due to the recorrection of the position of the second window. Therefore, the value of the display priority counter is checked in step 624 to see if it coincides with the initial value or not. If the value of the counter is other than the initial value, the processing routine is returned to step 616. If they coincide, step 630 follows.

With respect to all of the second windows incorporated in the first window WN, when the automatic correction of the display positions in the first table was finished in this manner, routine 650 follows after discriminating step 606 and the second and third tables are updated.

On the other hand, in the case where each window is displayed as a format having the stripe region to indicate the window name over the window, if steps 610, 612, and 622 in FIG. 11 are modified and the automatic shifting direction of the window is set to be always upward and the value of the exposed width $\delta$ is set to a value larger than the width of the stripe, the name portion of the window automatically shifted can be always visually observed.

In the present invention, when the window is automatically shifted to change the display priority of the window, the content of the third table indicative of the window priority before changing the display priority and the content of the first table indicative of the original position of the window automatically shifted may be also preliminarily stored into another memory area. Due to this, when the operator again instructs to change the display priority of the window, if this change results in the return to the display state before the change, the display screen which will not be influenced by the automatic shifting process can be reproduced by use of the window data previously stored.

We claim:

1. A display control method for a multiwindow system in which a plurality of windows are displayed on one display screen at positions such that said windows partially overlap and a display control for each of said windows is executed on the basis of window management data indicative of position, size and display priority of each window, said method comprising the steps of:

generating a command to change the display priority of a first one of said windows;

detecting, on the basis of said window management data, a second window existing at a position where it will be completely covered by at least said first window and will disappear from the screen if the display priority of said first window is changed as instructed by said command;

automatically correcting said window management data for said second window such that at least a part of said second window is displayed at a position where it can be seen on the display screen after the display priority has been changed as instructed by said command;

changing the window management data for said first window in accordance with the display priority instructed by said command subsequent to said detecting step; and updating the display screen to the state corresponding to said changed window management data.

2. A display control method according to claim 1, wherein said automatic correction of said window management data for said second window is executed so as to shift the position of the second window in a direction according to the positional relation between the second window and the other windows overlapping said second window.

3. A display control method according to claim 1, wherein said automatic correction of said window management data for said second window is executed so as to sift the position of the second window toward the upper side of the display screen.

4. A display control method according to claim 1, wherein said automatic correction of said window management data for said second window is executed by successively selecting a window to be compared with said second window in the order of a display priority among a group of windows having a display priority higher than that of the second window, in which group said first window has the highest priority and by repeating a process to check whether said second window is completely covered by said selected window and to shift the position of said second window so that at least a part of the second window is displayed at a position out of the bounds of said selected window if said second window is completely covered by said selected window.

5. A display control method according to claim 1, wherein said plurality of windows comprises more than two windows, and said generated command instructs a change in priority of said first window to a priority which is not said highest priority.

6. A display control method according to claim 1, wherein said window management data comprises a first table of data indicative of position and size of each window, a second table of data indicative of position and size of sub-regions of each window not covered by another window and a third table of data indicative of the display priority of each window.

7. A display control method according to claim 6, wherein said automatic correction of said window management data for said second window in response to a change in priority of said first window from a priority n to a priority n+k comprises:

identifying in said third table those windows including said second window having a priority of n+1 to n+k;

determining from said first and second tables that the portion of said second window currently being displayed will be covered by said first window when the display priority of said first window is changed according to said command; and automatically changing the data indicative of the window position of said second window in said first and second tables to shift the display position of said second window so that at least a portion thereof will be displayed after the priority of said first window is changed.

8. A display control method according to claim 7, wherein, prior to automatically changing the data in said first and second tables, the data in said first and third tables is stored for use priority between windows is to be later changed to the same priority relationship existing before the priority of the first window was changed.

9. A display control method for a multi-window system in which a plurality of windows are displayed on one display screen at positions such that said windows partially overlap in accordance with selected display priorities and a display control for each of said windows is executed on the basis of window management data indicative of position, size and display priority of each window, said method comprising the steps of:

storing in memory a respective set of window management data for each of different combinations of display priority of said windows, each of said sets including data indicating the display position of each window according to the respective display priority of the windows such that, for any combination of priorities in which one window will be completely covered by one or more other windows, the display position of that one window as indicated by the data in that set will be shifted with respect to the display position of that one window as indicated in the other sets to a position where at least a part of said one window is not covered;

generating a command indicating a selected combination of priorities of said windows; and displaying said windows with said selected combination of priorities in response to said command on the basis of a set of window management data stored in memory which corresponds to said selected combination of priorities.

* * * * *